United States Patent Office 3,248,410
Patented Apr. 26, 1966

3,248,410
CHELATE BURNING RATE MODIFIERS
Morris B. Berenbaum, Levittown, Pa., assignor to Thiokol Chemical Corporation, Bristol, Pa., a corporation of Delaware
No Drawing. Filed Oct. 29, 1962, Ser. No. 234,579
17 Claims. (Cl. 260—429)

This invention relates to new chelate complexes and to their preparation and use as a means of modifying the burning rate properties of solid propellant compositions.

Liquid, curable, polymeric materials are used in the rocket arts as binders to prepare propellant fuels therewith. The liquid, curable polymeric materials are blended with the other ingredients of the proposed fuel composition which includes a curing agent for the liquid polymers, oxidizers, fillers and burning rate modifiers and the resulting composition is then subjected to the necessary cure conditions which will cause the liquid polymer to react with the curing agent to form a solid fuel matrix comprising the cured polymer and the various other ingredients of the fuel randomly dispersed therein. It is essential that the various components of the solid fuel system be evenly distributed to avoid imparting erratic firing properties to the fuel matrix. Because of the relatively viscous nature of the uncured systems and the relatively large sized batches of the systems usually prepared at one time commercially it is very difficult, if not impossible, to readily obtain a uniform dispersion of the components throughout the system.

An object of the present invention is to provide monomeric polymerizable chelates which may be used to modify the burning rate properties of solid propellant compositions made therewith.

Another object of this invention is to provide means for modifying the burning rate properties of polymeric propellant binder materials by chemically incorporating monomeric chelate materials in the polymeric binder materials.

Still another object of this invention is to provide novel chelate containing polymers.

It has been unexpectedly found, according to the present invention that the burning rate properties of a propellant composition or matrix can be readily and reproducibly regulated if the polymeric binder used in the fabrication of the matrix is formed, in part, from one or more monomeric, polymerizable chelates having the structure

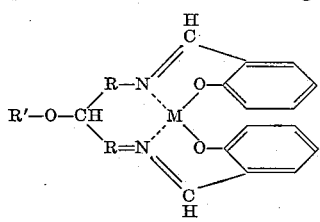

in which R is a lower alkylene group, R' may be

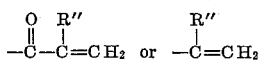

R'' may be H or $CH_3$ and M is a heavy metal such as iron, nickel, cobalt, copper, cadmium, zinc, lead and manganese. The chelate moieties act as the burning rate modifiers for the propellant composition and the desired burning rate characteristics can be readily and reproducibly imparted to the propellant matrix by regulating the amount and type of chelate incorporated in the polymeric binder. Being an integral component of the liquid polymer binder, the chelate burning rate modifiers of the present invention are readily dispered, uniformly, throughout the propellant matrix.

The polymerizable monomeric chelates which are usefully employed as burning rate controlling components of solid propellant fuels according to the present invention are prepared by a three-step process according to Equations 1, 2 and 3, shown below.

A hydroxy alkylene diamine is first reacted with 2 moles of salicylal aldehyde in a solvent medium such as ethanol to form a di-Schiff base

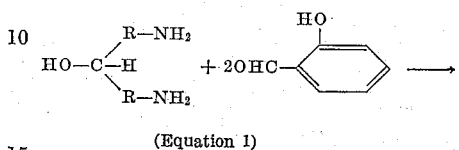

(Equation 1)

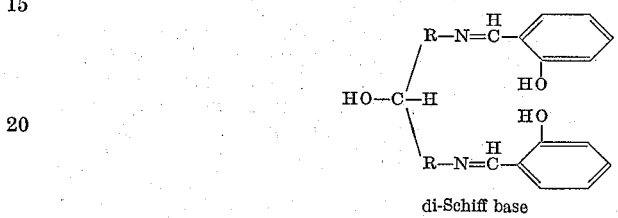

di-Schiff base in which R is preferably a lower alkyl group.

The di-Schiff base, sodium hydroxide, and sodium acetate is then dissolved in boiling water and reacted with a soluble salt of a heavy metal.

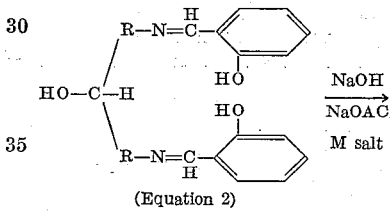

(Equation 2)

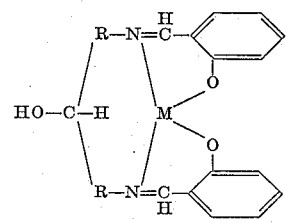

The chelate thus produced is then further esterified to form an acrylic ester thereof through its reaction with acrylyl chloride in triethylamine or acrylic anhydride:

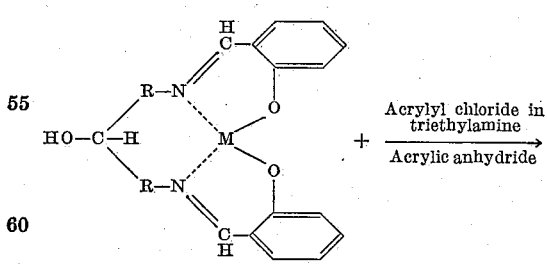

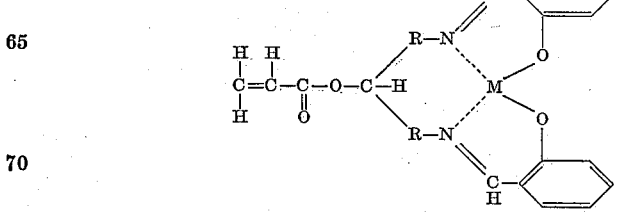

The extreme insolubility of this class of metal chelates in water and in organic solvents of all types necessitates the conduction of the esterification reaction under heterogeneous conditions.

In preparing the curable, polymeric binder materials according to the present invention the polymerizable, monomeric chelates disclosed above are copolymerized with one or more of the monomeric materials customarily employed to form such binder materials. These monomeric materials include diene and vinyl type monomers such as butadiene, acrylic acid and methacrylic acid. The polymerization reaction may be carried out in bulk or in solution using either free radical or ionic type initiators such as azobisisobutyronitrile. Where a butadiene/acrylic acid/chelate system is being polymerized the less reactive member, butadiene, is added all at once initially and the more reactive members of the system, acrylic acid and the chelate are added intermittently during the course of the reaction to maintain the ratio of monomers needed to produce a polymer having the desired monomer content. Where the chelate is a solid it may be added to the polymerization system in the form of a benzene solution.

The molecular weight of the resulting polymer, moreover, can be regulated with a chain transfer agent such as t-dodecylmercaptan. By using the proper ratio of monomers to chain transfer agents, liquid polymer of predetermined viscosities can be obtained. Liquid polymers are preferred because of ease of blending with the other components of the fuel system.

At the termination of the reaction the polymers are readily recovered from the unreacted monomeric material either by evaporating the more volatile monomers or by washing the polymers.

The following examples are merely illustrative of the present invention and are not intended as a limitation upon the scope thereof.

EXAMPLE 1

*Preparation of bis N,N'-disalicylal-2-acryloxy-1,3-propylene diamine nickel chelate*

Salicylaldehyde was purified by shaking it with powdered calcium carbonate, followed by distillation. To a solution of 48.8 g. (0.4 m.) of the thus purified salicylaldehyde in 70 ml. of boiling ethanol there was added 18.0 g. (0.2 m.) of 1,3-diaminopropanol. In 20 to 30 seconds the mass became solid with formation of a bright yellow, crystalline material, N,N'-disalicylal-2-hydroxy-1,3-propylene diamine. The reaction mixture was cooled and filtered on a Buchner funnel, and the precipitate was spread in thin layers on absorbent paper to dry.

The finely ground N,N'-disalicylal-2-hydroxy-1,3-propylene diamine, 15.5 g. (0.4 mols less 0.5 g.) of sodium hydroxide and 2.0 g. of sodium acetate were dissolved in 600 ml. of boiling water. Solution of the disalicylal-2-hydroxy-1,3-propylene diamine requires from 10 to 20 minutes and depends on the state of subdivision of the material and the agitation given the mixture. Stirring was continued subsequently while 47.6 grams (0.2 m.) of nickel chloride·$6H_2O$ was added, until the mixture became a paste. The mass was covered with ½ inch of water and allowed to stand for at least 15 minutes. Then it was centrifuged until most of the mother liquor had been removed and a hard cake remained. The product was dried in vacuum at 90° C. and weighed 64.9 grams of N,N'-disalicylal-2-hydroxy-1,3-propylene-diamine nickel chelate.

61.5 g. (0.15 m.) of the nickel chelate produced above, 25.2 g. (0.2 m.) of acrylic anhydride and 200 ml. of benzene were combined in a 500 ml. round-bottomed flask equipped with a mechanical stirrer and a vented outlet to the fume hood. Hydroquinone (2 g.) was added and the mixture was stirred for 6 hours at room temperature, a slight temperature rise (2°) was noted during the first hour. The reaction mixture was poured into cold water and allowed to stand for several hours at room temperature and the product was collected by filtration and dried in a vacuum dessicator at room temperature. The yield was 49 g. (80%) of bis-N,N'-disalicylal-2-acryloxy-1,3-propylene diamine nickel chelate, a dark green solid.

EXAMPLE 2

*Preparation of bis-N,N'-disalicylal-2-acryloxy-1,3-propylene diamine iron chelate*

Salicylaldehyde was purified by shaking it with powdered calcium carbonate, followed by distillation. To a solution of 48.8 g. (0.4 m.) of the thus purified salicylaldehyde in 70 ml. of boiling ethanol there was added 18.0 g. (0.2 m.) of 1,3-diaminopropanol. In 20 to 30 seconds the mass became solid with formation of a bright yellow crystalline material N,N'-disalicylal-2-hydroxy-1,3-propylene diamine. The reaction mixture was cooled and filtered on a Buchner funnel, and the precipitate was spread in thin layers on absorbent paper to dry.

The finely ground N,N'-disalicylal-2-hydroxy-1,3-propylene diamine, 15.0 g. (0.4 mols less 1 g.) of sodium hydroxide and 2.0 g. of sodium acetate were dissolved in 600 ml. of boiling water. Stirring was continued subsequently while 55.6 grams of iron sulfate·$7H_2O$ was added, until the mixture became a paste. The mass was covered with ½ inch of water and allowed to stand for at least 15 minutes. Then it was centrifuged until most of the mother liquor had been removed and a hard cake remained. The product was dried in vacuum at 90° C. and weighed 74.6 grams of N,N'-disalicylal-2-hydroxy-1,3-propylene diamine iron chelate.

70.4 g. (0.2 m.) of the iron chelate produced above, 31.5 (0.25 m.) of acrylic anhydride and 200 ml. of benzene were combined in a 500 ml. round-bottomed flask equipped with a mechanical stirrer and a vented outlet to the fume hood. Hydroquinone (2 g.) was added and the mixture was stirred for 6 hours at room temperature, a slight temperature rise (2°) was noted during the first hour. The reaction mixture was poured into cold water and allowed to stand for several hours at room temperature and the product was collected by filtration and dried in a vacuum dessicator at room temperature for 48 hours. The yield was 66.6 g. (82%) of bis-N,N'-disalicylal-2-acryloxy-1,3-propylene diamine iron chelate.

EXAMPLE 3

*Preparation of bis-N,N'-disalicylal-2-acryloxy-1,3-propylene diamine cobalt chelate*

Salicylaldehyde was purified by shaking or by standing in contact with powdered calcium carbonate, followed by distillation. To a solution of 48.4 g. (0.4 m.) of the thus purified salicylaldehyde in 70 ml. of boiling ethanol was added 18.0 g. (0.2 m.) of 1,3-diaminopropanol. In 20 to 30 seconds the mass became solid with formation of a bright yellow crystalline material N,N'-disalicylal-2-hydroxy-1,3-propylene diamine. The reaction mixture was cooled and filtered on a Buchner funnel, and the precipitate was spread in thin layers on absorbent paper to dry.

The finely ground N,N'-disalicylal-2-hydroxy-1,3-propylene diamine, 15.5 g. (0.4 mols less 0.5 g.) of sodium hydroxide and 2.0 g. of sodium acetate were dissolved in 600 ml. of boiling water. Stirring was continued subsequently while 49.8 g. (0.2 m.) of cobalt acetate·$H_2O$ was added, until the mixture became a paste. The mass was covered with ½ inch of water and allowed to stand for at least 15 minutes. Then it was centrifuged until most of the mother liquor had been removed and a hard cake remained. The product was dried in vacuum at 90° C. and weighed 64.9 g. (92%) of N,N'-disalicylal-2-hydroxy-1,3-propylenediamine cobalt chelate.

64.9 g. (0.18 m.) of the cobalt chelate produced above, 31.5 g. (0.25 m.) of acrylic anhydride and 200 ml. of benzene were combined in a 500 ml. round-bottom flask equipped with a mechanical stirrer and a vented outlet to the fume hood. Hydroquinone (0.5 g.) was added and the mixture was stirred for 6 hours at room temperature, a slight temperature rise (2°) was noted during the first hour. The reaction mixture was poured into cold water and allowed to stand for several hours at room temperature and the product was collected by filtration and dried in a vacuum dessicator at room temperature for 48 hours. The yield was 76% of bis-N,N'-disalicylal-2-acryloxy-1,3-propylenediamine cobalt chelate.

Using acetate salts of the desired metals the procedure described in Example 3 above was used to produce other chelates of N,N' - disalicylal-2-hydroxy-1,3 - propylenediamine. The metals used, yields obtained and metal content of the chelates obtained are as follows:

| Metal | Percent yield | Metal analysis, percent |
|---|---|---|
| Cu | 94 | 16.22 |
| Cd | 96 | 23.41 |
| Zn | 94 | 15.43 |
| Pd | 90 | |
| Mn | 104 | 14.96 |

EXAMPLE 4

Terpolymer propellant binders were made using butadiene, acrylic acid and the cobalt, iron and nickel chelates prepared in Examples 1 to 3 above. Each of the polymerizations were conducted in bulk in one quart stainless steel reactors at 80° C. for about 48 hours. The polymerization recipe in each case was:

| | |
|---|---|
| 1,3-butadiene, grams | 324 |
| Acrylic acid, grams | 28.6 |
| Chelate, grams in 100 ml. of toluene | 2 |
| t-Dodecyl mercaptan, ml. | 7.5 |
| Azobisisobutyronitrile, grams | 12 |

In each polymerization recation all the butadiene was charged initially while the acrylic acid, chelate, t-dodecylmercaptain and azobisisobutyronitrile were each added in three approximately equal increments, each 1.6 hours apart.

At the termination of the polymerization period, each of the resulting mixtures was transferred to an open container from which the unreacted butadiene was removed by evaporation. The resulting liquid terpolymers were then washed three to four times with methanol and dried to constant weight in a vacuum oven at 45° to 60° C. The composition and properties of the resulting terpolymers is as follows:

EXAMPLE 5

Metal chelates of disalicylal propylene diamine, i.e.,

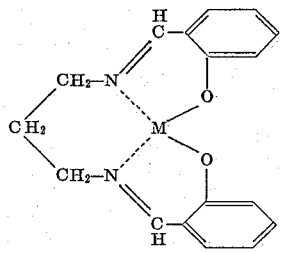

in which M is a heavy metal, where physically dispersed in propellant compositions produce little change in the burning rate of the propellant. However, the corresponding, polymerizable chelate compounds of the present invention when chemically incorporated in propellant compositions by the use of chelate containing polymers produce substantial increases in the burning rates of the propellants.

To demonstrate this unexpected result propellant compositions were prepared, for comparison purposes, which contained chelate materials that were both physically and chemically incorporated therein. The non-polymerizable chelates were physically dispersed in the propellant compositions tested to the extent of 2% by weight of the composition and the polymerizable chelates were added in the form of terpolymers to the extent of about 0.15 to 0.18% by weight of the composition (calculated in terms of percent of monomeric chelate in the propellant composition).

The propellant formulation used for all the experiments was as follows:

| Component of propellant | Percent by weight of components used for— | |
|---|---|---|
| | Physical dispersion | Chemical dispersion |
| Ammonium perchlorate (coarse—about 180μ) | 57.20 | 57.20 |
| Ammonium perchlorate (fine—about 12μ) | 11.70 | 11.70 |
| Chelate containing terpolymer | | 13.70 |
| Butadiene/acrylic acid copolymer [1] | 13.70 | |
| Non-polymerizable Chelate | 2 | |
| Epi-Rez 510 (epoxy resin marketed by Jones Dabney, which is an epichlorohydrin/bisphenol A type material having an epoxy equivalent of about 180-200) [2] | 4.30 | 4.30 |
| Aluminum powder (12-15μ) | 13.00 | 13.00 |

[1] Copolymer made as in Example 5 without chelate.
[2] Epoxy resin used as a curing agent for the carboxyl containing copolymer or terpolymer.

| | Terpolymer properties | | | | | |
|---|---|---|---|---|---|---|
| | Composition (mole percent) | | | Viscosity (poise at 25° C.) | Analysis (percent by weight) | Carboxyl group (eq./100g.) |
| | Mb [1] | Ma [1] | Mc [1] | | | |
| Polymer containing— | | | | | | |
| Co | 97.20 | 2.73 | 0.08 | 190 | N, 0.8; Co, 0.07. | 0.052 |
| Fe | 96.81 | 2.99 | 0.2 | 180 | N, 0.86; Fe, 0.17. | 0.054 |
| Ni | 96.72 | 3.10 | 0.18 | 194 | N, 0.85; Ni, 0.16. | 0.056 |

[1] Butadiene, acrylic acid and chelate are designated as Mb, Ma, and Mc, respectively.

The burning rate data obtained using various chelates in the above formulation is shown below:

DISPERSION ADDITION—2%

| Non-polymerizable chelate of N,N'-disalicylal propylene diamine | Burning rate at 1,000 p.s.i. (in./sec.) | Pressure exponent |
| --- | --- | --- |
| Control | .30 | .39 |
| Fe Chelate | .36 | .23 |
| Pb Chelate | .26 | .35 |
| Ni Chelate | .26 | .29 |
| Cu Chelate | .31 | .27 |
| Cd Chelate | .27 | .29 |
| Zn Chelate | .29 | .24 |

CHEMICAL ADDITION

| Chelate of N,N'-disalicylal propylenediamine used in terpolymer | Burning rate at 1,000 p.s.i. (in./sec.) | Pressure exponent |
| --- | --- | --- |
| Fe | .41 | .38 |
| Ni | .35 | .47 |
| Co | .40 | .45 |

The data shows that it is possible to substantially increase the burning rate properties of propellant compositions using the polymerizable chelates of the present invention in terpolymer propellant binders.

I claim:

1. A composition of matter having the structure

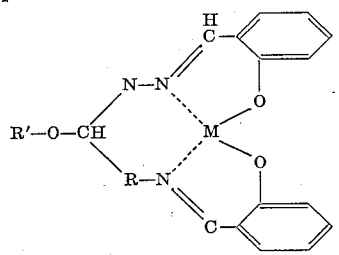

in which R is a lower alkylene group, R' is selected from the group consisting of

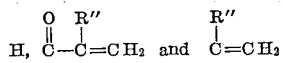

in which R'' is selected from the group consisting of H and $CH_3$ and M is a heavy metal.

2. A composition of matter as in claim 1 in which R is $CH_2$.

3. A composition of matter as in claim 1 in which M is iron.

4. A composition of matter as in claim 1 in which M is nickel.

5. A composition of matter as in claim 1 in which M is cobalt.

6. A composition of matter as in claim 1 in which M is copper.

7. A composition of matter as in claim 1 in which M is cadmium.

8. A composition of matter as in claim 1 in which M is zinc.

9. A composition of matter as in claim 1 in which M is lead.

10. A composition of matter as in claim 1 in which M is manganese.

11. A composition of matter as in claim 1 in which R' is H.

12. A composition of matter as in claim 1 in which R' is

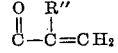

13. A composition of matter as in claim 12 in which R'' is H.

14. A composition of matter as in claim 12 in which R'' is $CH_3$.

15. A composition of matter as in claim 1 in which R' is

16. A composition of matter as in claim 15 in which R'' is H.

17. A composition of matter as in claim 15 in which R'' is $CH_3$.

References Cited by the Examiner

UNITED STATES PATENTS

| | | | |
| --- | --- | --- | --- |
| 3,014,939 | 12/1961 | Kluiber | 260—429 |
| 3,058,858 | 10/1962 | Butchelder et al. | 149—19 |
| 3,067,076 | 12/1962 | Butcher et al. | 149—19 |
| 3,076,834 | 2/1963 | Norton | 260—429 |
| 3,082,229 | 3/1963 | Nash | 260—429 |

TOBIAS E. LEVOW, *Primary Examiner.*

CARL D. QUARFORTH, *Examiner.*